(12) United States Patent
Chen et al.

(10) Patent No.: US 10,824,009 B2
(45) Date of Patent: Nov. 3, 2020

(54) LIGHT-EMITTING KEYBOARD AND BACKLIGHT MODULE

(71) Applicants: LITE-ON ELECTRONICS (GUANGZHOU) LIMITED, Guangzhou (CN); Lite-On Technology Corporation, Taipei (TW)

(72) Inventors: Yi-Wen Chen, Taipei (TW); Hsin-Chih Liang, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/528,592

(22) Filed: Jul. 31, 2019

(65) Prior Publication Data
US 2020/0043681 A1  Feb. 6, 2020

Related U.S. Application Data

(60) Provisional application No. 62/712,993, filed on Aug. 1, 2018.

(30) Foreign Application Priority Data

Jul. 11, 2019 (CN) .......................... 2019 1 0623300

(51) Int. Cl.
*G02F 1/13357* (2006.01)
*H01H 13/83* (2006.01)
(Continued)

(52) U.S. Cl.
CPC ..... *G02F 1/133603* (2013.01); *G02B 6/0036* (2013.01); *G02B 6/0055* (2013.01); *G02B 6/0068* (2013.01); *G02B 6/0073* (2013.01);

*G06F 1/169* (2013.01); *H01H 13/83* (2013.01); *H01H 2219/044* (2013.01);
(Continued)

(58) Field of Classification Search
CPC ............ G02F 1/133603; G02B 6/0036; G02B 6/0055; G02B 6/0068; G02B 6/0073; H01H 13/83
See application file for complete search history.

(56) References Cited

U.S. PATENT DOCUMENTS

2013/0229357 A1* 9/2013 Powell .................. G06F 3/0412
345/173
2014/0049983 A1* 2/2014 Nichol ................. G02B 6/0018
362/610

* cited by examiner

*Primary Examiner* — Anabel Ton
(74) *Attorney, Agent, or Firm* — JCIPRNET

(57) ABSTRACT

A light-emitting keyboard is provided, including a bracket with at least one opening, a keycap, a circuit layer, a light guide plate, and a composite light-emitting layer. The keycap is connected to the bracket via a support assembly. The circuit layer is disposed between the keycap and the bracket. The light guide plate is disposed under the bracket. The composite light-emitting layer disposed under the bracket has a light-shielding pattern. The composite light-emitting layer includes a light-transmitting substrate, a first circuit, a first light source, and a first passivation layer. The first circuit is disposed on one side of the light-transmitting substrate. The first light source is disposed on one side of the light-transmitting substrate and electrically connected to the first circuit. The first passivation layer covers the first circuit, and at least a portion of the first circuit is located between the first passivation layer and the light-transmitting substrate.

24 Claims, 13 Drawing Sheets

(51) Int. Cl.
*F21V 8/00* (2006.01)
*G06F 1/16* (2006.01)
(52) U.S. Cl.
CPC . *H01H 2219/062* (2013.01); *H01H 2219/064* (2013.01); *H01H 2221/07* (2013.01)

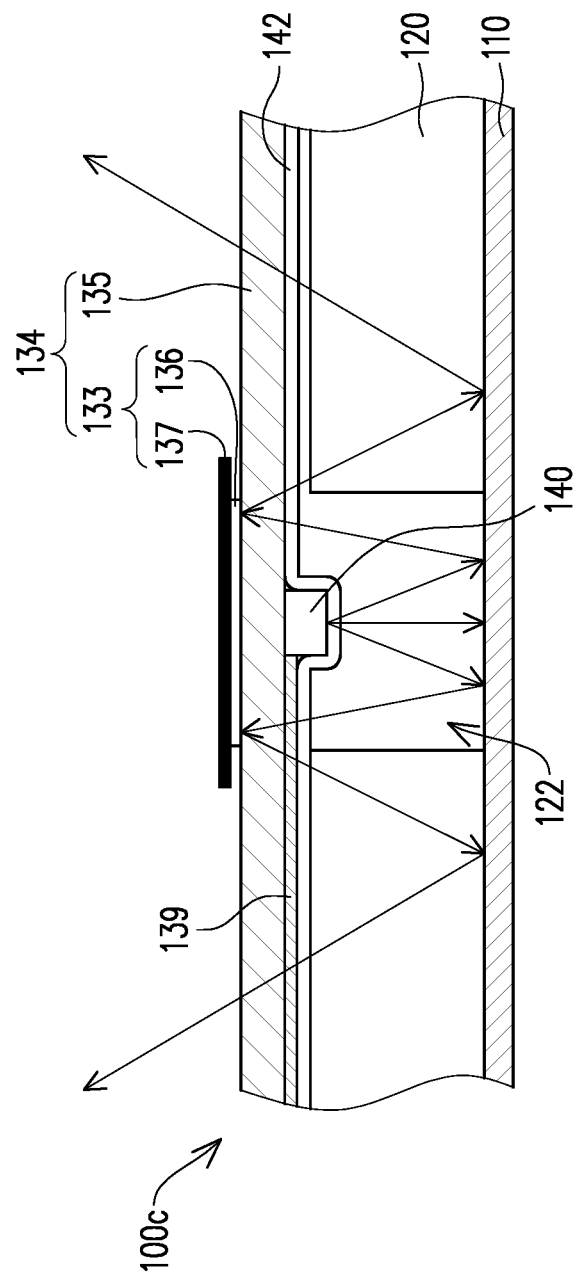

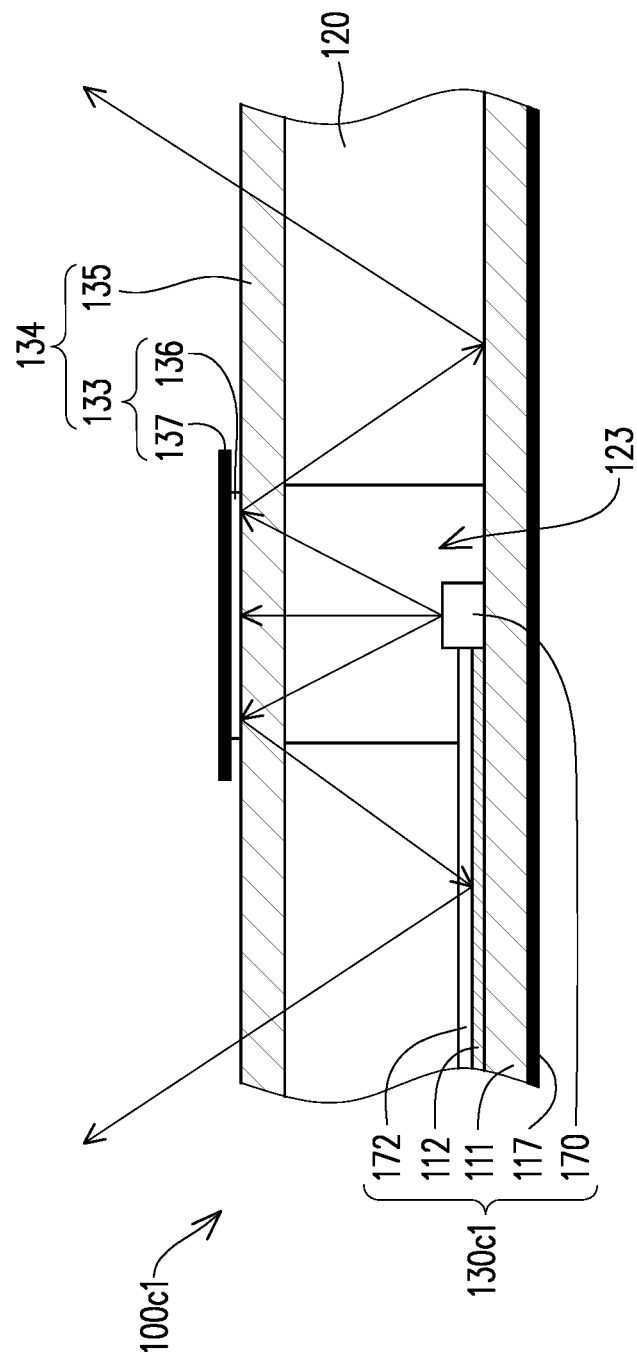

LIGHT-EMITTING KEYBOARD AND BACKLIGHT MODULE

CROSS-REFERENCE TO RELATED APPLICATION

This application claims the priority benefits of U.S. provisional application Ser. No. 62/712,993, filed on Aug. 1, 2018, and China application serial no. 201910623300.8, filed on Jul. 11, 2019. The entirety of each of the above-mentioned patent applications is hereby incorporated by reference herein and made a part of this specification.

BACKGROUND OF THE INVENTION

Field of the Invention

The invention relates to a backlight module and a light-emitting keyboard, and more particularly to an ultra-thin backlight module and light-emitting keyboard.

Description of Related Art

With the development of technology, the appearance of electronic products tends to be lighter and thinner, and creating visual interest is an upward trend. Taking buttons as an example, light-emitting buttons have been designed to increase aesthetics or recognizability. In the light-emitting button, a backlight module is mainly provided under a button structure, and how to make the backlight module provide various optical effects or slim down the backlight module is the latest research direction.

SUMMARY OF THE INVENTION

The invention provides a backlight module having a scaled-down thickness.

A light-emitting keyboard of the invention can display various backlighting effects.

A light-emitting keyboard of the invention includes a bracket, a keycap, a circuit layer, a light guide plate, and a composite light-emitting layer. The bracket has at least one opening. The keycap is disposed on the bracket and connected to the bracket via a support assembly. The circuit layer is disposed between the keycap and the bracket. The light guide plate is disposed under the bracket. The composite light-emitting layer is disposed under the bracket and has a light-shielding pattern. The composite light-emitting layer includes a light-transmitting substrate, a first circuit, a first light source, and a first passivation layer. The first circuit is disposed on one side of the light-transmitting substrate. The first light source is disposed on one side of the light-transmitting substrate and electrically connected to the first circuit. The first passivation layer covers the first circuit, and at least a portion of the first circuit is located between the first passivation layer and the light-transmitting substrate.

In an embodiment of the invention, a light-reflecting plate is further disposed under the bracket, wherein the light guide plate is disposed between the composite light-emitting layer and the light-reflecting plate.

In an embodiment of the invention, the light-shielding pattern has a light-transmitting region disposed corresponding to the keycap, and the first light source is located in the light-transmitting region.

In an embodiment of the invention, the composite light-emitting layer further includes a light-shielding plate disposed between the light-transmitting substrate and the light guide plate or disposed between the bracket and the light-transmitting substrate, and the light-shielding pattern is formed on the light-shielding plate.

In an embodiment of the invention, the light-emitting keyboard further includes a second light source and a circuit board disposed under the composite light-emitting layer, wherein the second light source is disposed towards the light guide plate and is electrically connected the circuit board under the light guide plate, and the first circuit of the composite light-emitting layer is electrically connected to the circuit board.

In an embodiment of the invention, the composite light-emitting layer further includes a second circuit, a second light source, and a second passivation layer. The second circuit is disposed on one side of the light-transmitting substrate. The second light source is disposed on one side of the light-transmitting substrate and electrically connected to the second circuit. The second passivation layer covers the second circuit, and at least a portion of the second circuit is located between the second passivation layer and the light-transmitting substrate, and the light-shielding pattern is disposed corresponding to the first light source.

In an embodiment of the invention, the first light source and the second light source are located on a same side of the light-transmitting substrate, and the first light source emits a light towards the light guide plate.

In an embodiment of the invention, the first light source and the light guide plate are located on opposite sides of the light-transmitting substrate, and the first light source is disposed in the opening of the bracket.

In an embodiment of the invention, the first light source and the light guide plate are located on a same side of the light-transmitting substrate, the light guide plate has a hole, and the first light source is disposed at a position corresponding to the hole.

In an embodiment of the invention, the keycap has at least one light-transmitting portion, and the first light source is disposed corresponding to the light-transmitting portion.

In an embodiment of the invention, the light guide plate is disposed between the bracket and the composite light-emitting layer, and the first light source and the light guide plate are located on a same side of the light-transmitting substrate.

In an embodiment of the invention, the first light source and the light-shielding pattern are located on opposite sides of the light-transmitting substrate, the light-shielding pattern covers a lower surface of the light-transmitting substrate, and the first passivation layer is a reflective layer.

In an embodiment of the invention, the first circuit of the composite light-emitting layer includes a printed conductive paste or a patterned metal layer, and the first circuit is located under a non-opening region of the bracket.

In an embodiment of the invention, the first light source includes a plurality of light-emitting diodes, and each of the light-emitting diodes emits light with a different wavelength.

In an embodiment of the invention, the light guide plate has a plurality of microstructures, disposed on a lower or upper surface of the light guide plate corresponding to the opening of the bracket.

A backlight module of the invention is adapted to be disposed under a button structure. The backlight module includes a light-reflecting plate, a light guide plate, and a composite light-emitting layer. The light guide plate is disposed on the light-reflecting plate. The composite light-emitting layer is disposed on the light guide plate and includes a first light source and a light-shielding pattern. The light guide plate has a plurality of microstructures disposed on a surface of the light guide plate opposite to the first light source.

In an embodiment of the invention, the composite light-emitting layer includes a light-transmitting substrate, a first circuit disposed on the light-transmitting substrate, and a light-shielding plate, wherein the first light source is disposed on the light-transmitting substrate and electrically connected to the first circuit, the light-shielding layer is located between the light guide plate and the light-transmitting substrate or located between the button structure and the light-transmitting substrate, and the light-shielding pattern is formed on the light-shielding plate.

In an embodiment of the invention, the backlight module further includes a circuit board and a second light source. The circuit board is placed under the light-reflecting plate. The second light source is disposed on and electrically connected to the circuit board, the second light source passes through the light-reflecting plate and being disposed towards the light guide plate, and the first circuit is electrically connected to the circuit board.

In an embodiment of the invention, the composite light-emitting layer includes a light-shielding plate disposed on the light guide plate and a first circuit disposed on the light-shielding plate, and the first light source is disposed on the light-shielding plate and electrically connected to the first circuit.

In an embodiment of the invention, the light guide plate has a hole, the first light source is disposed on a surface of the light-shielding plate facing the light guide plate and disposed at a position corresponding to the hole, and the first light source on the light-shielding plate is arranged within a coverage of the light-shielding pattern.

In an embodiment of the invention, the composite light-emitting layer has a light-transmitting region not covered by the light-shielding pattern, and the first light source is disposed at on a surface of the light-shielding plate facing the light guide plate or the light-reflecting plate, and is arranged within a coverage of the light-transmitting region.

In an embodiment of the invention, the first light source is disposed on a surface of the light-shielding plate distal to the light guide plate.

In an embodiment of the invention, the first circuit is located at a position corresponding to the light-shielding pattern.

In an embodiment of the invention, the composite light-emitting layer includes a light-transmitting substrate and a first circuit disposed on the light-transmitting substrate, the first light source is disposed on the light-transmitting substrate and electrically connected to the first circuit, the first light source and the light guide plate are located on a same side of the light-transmitting substrate, and the first light source and the light-shielding pattern are located on two opposite sides of the light-transmitting substrate.

Based on the above, the light-emitting keyboard of the invention has a composite light-emitting layer disposed under the bracket. The backlight module of the invention also has a composite light-emitting layer disposed under the button structure. The first light source is integrated into the composite light-emitting layer, so that the light-emitting keyboard and the backlight module could be miniaturized in thickness.

BRIEF DESCRIPTION OF THE DRAWINGS

The accompanying drawings are included to provide a further understanding of the invention, and the drawings are incorporated into the present specification and form a portion of the present specification. The drawings illustrate embodiments of the invention and are used to explain the principles of the invention with the descriptions.

FIG. 4B is a partial cross-sectional view of the backlight module of FIG. 4A.

FIG. 4C is a cross-sectional view of another portion of the backlight module of FIG. 4A.

DESCRIPTION OF THE EMBODIMENTS

Figure 1A:
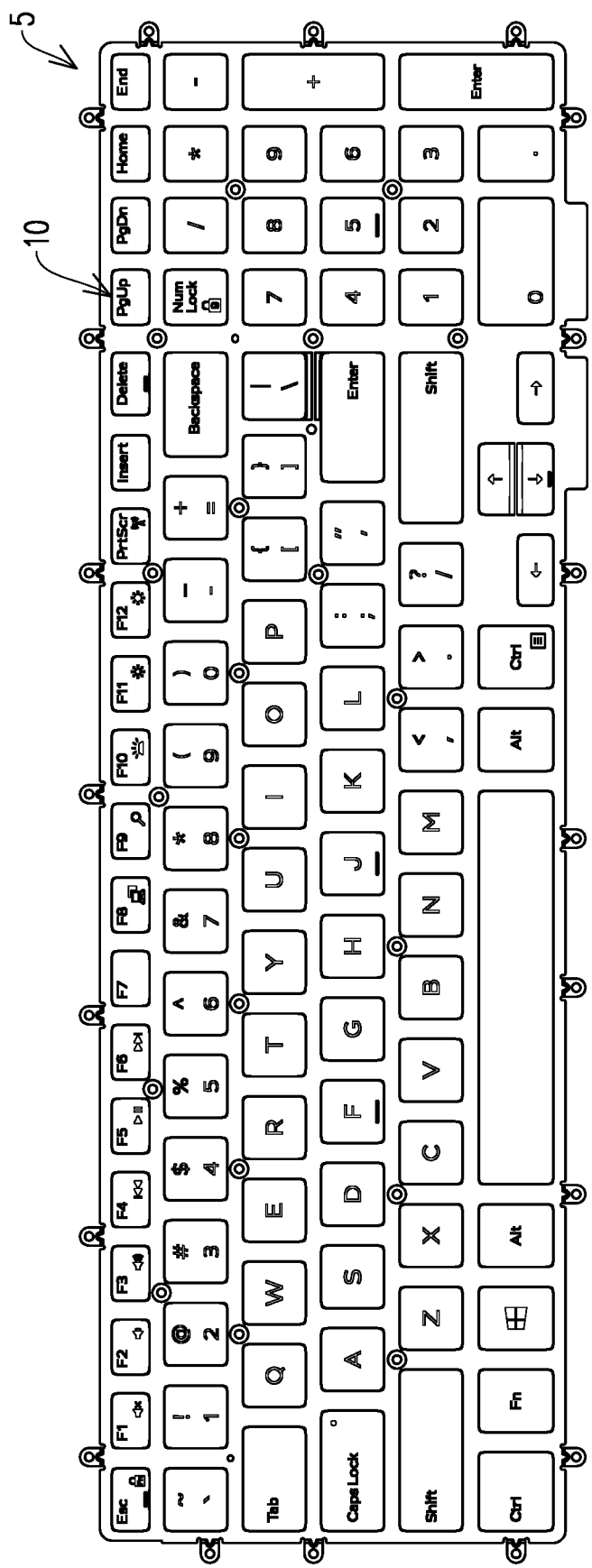
FIG. 1A is a top view of a light-emitting keyboard according to an embodiment of the invention.

Hereinafter, exemplary embodiments of the invention are described in detail, and examples of the exemplary embodiments are conveyed via the figures. Wherever possible, the same reference numerals are used in the figures and the descriptions to refer to the same or similar portions.

Figure 1B:
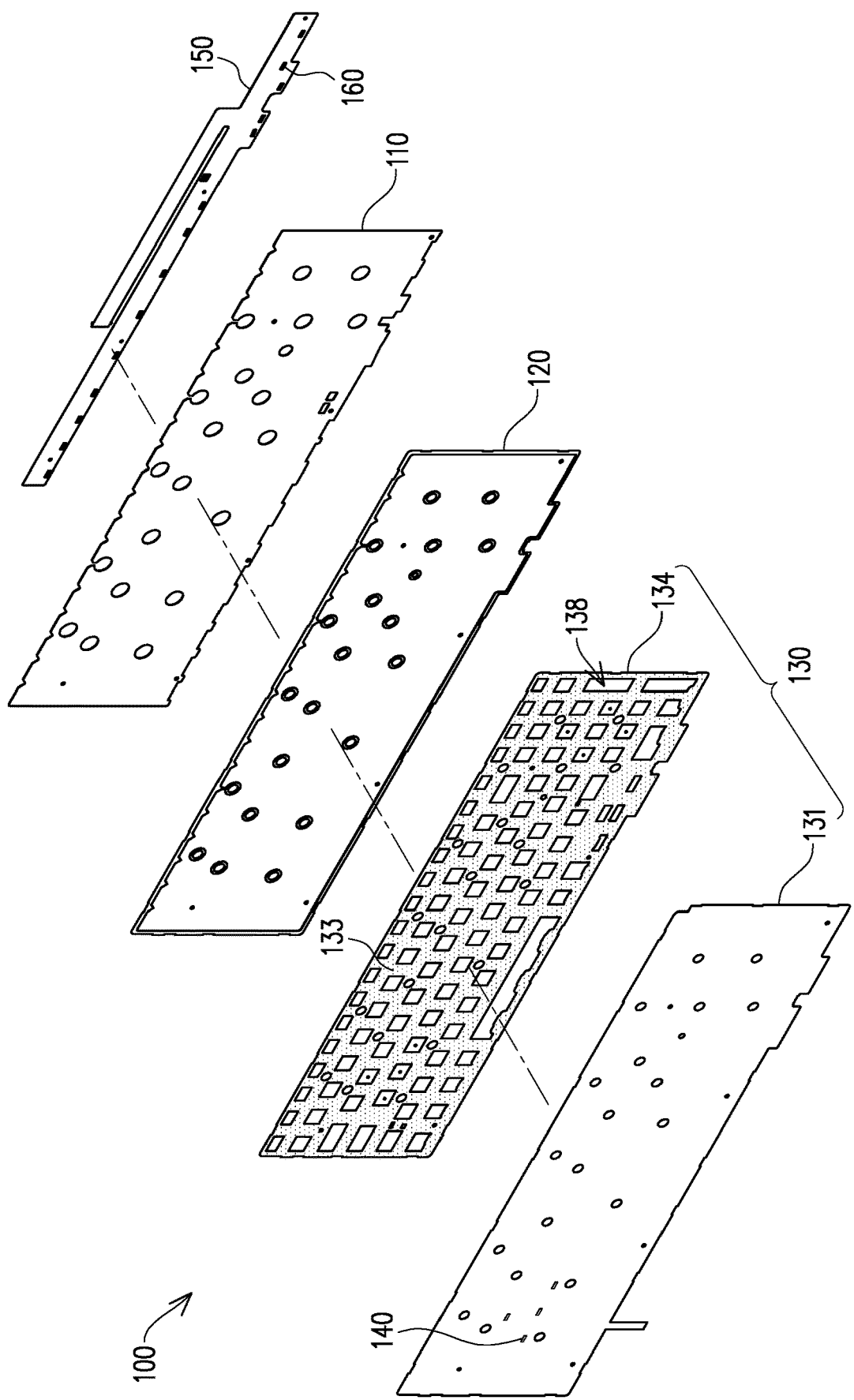
FIG. 1B is an exploded view of a backlight module of the light-emitting keyboard of FIG. 1A.

FIG. 1A is a top view of a light-emitting keyboard according to an embodiment of the invention. FIG. 1B is an exploded view of a backlight module of the light-emitting keyboard of FIG. 1A.

Referring to FIG. 1A and FIG. 1B, a light-emitting keyboard 5 of the present embodiment includes at least one button structure 10 and a backlight module 100 located under the button structure 10. Light provided by the backlight module 100 illuminates the rear side of the button structure 10 to provide the user with an identification or various visual effects. The light-emitting keyboard 5 shown in FIG. 1A is exemplified by, for example but not limited to, a keyboard of a notebook computer.

Figure 1C:
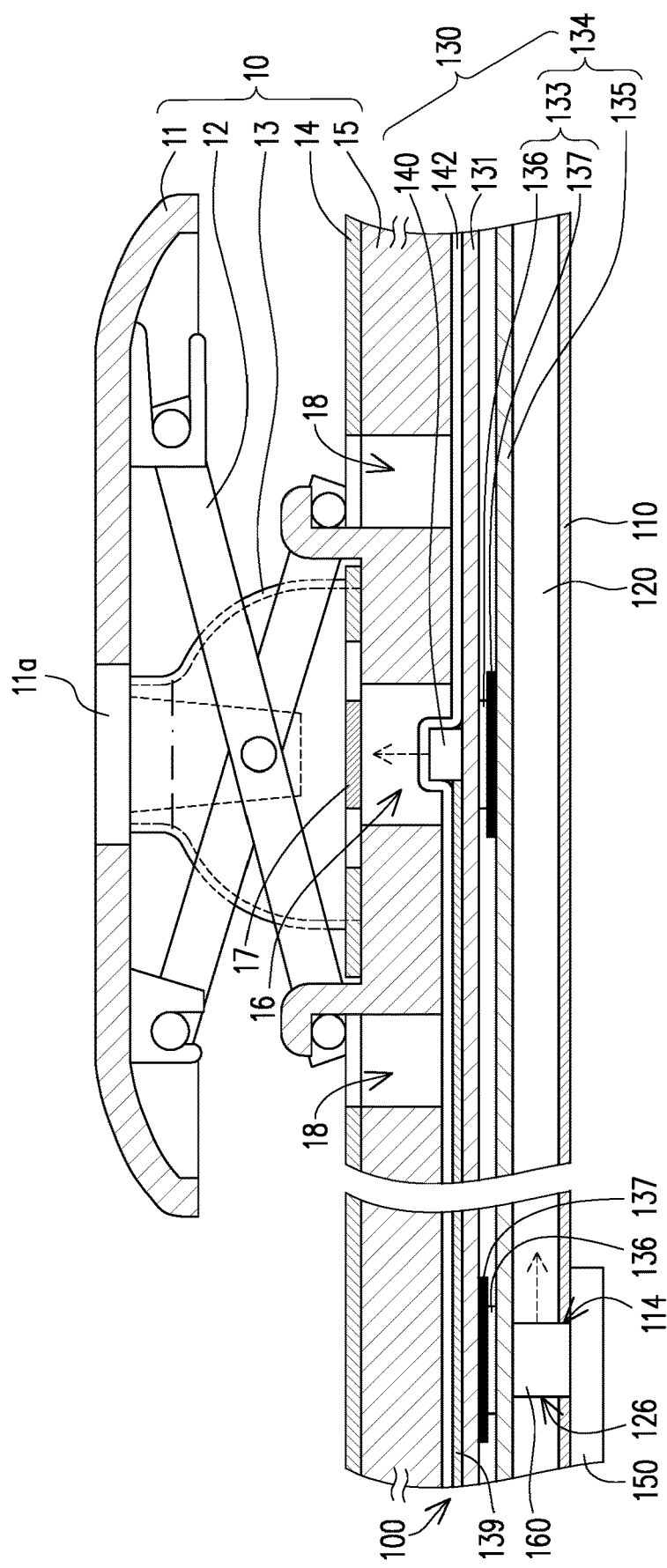
FIG. 1C is a partial cross-sectional view of the button structure with the backlight module of FIG. 1B disposed thereunder.

FIG. 1C is a partial cross-sectional view of the button structure with the backlight module of FIG. 1B disposed thereunder. It should be noted that, in order to clearly show the detailed structure of the backlight module, only a single button structure 10 is schematically shown in FIG. 1C, and the relationship in size of elements included in the button structure 10 and the backlight module 100 is only for schematic illustration.

As shown in FIG. 1C, in the present embodiment, the button structure 10 includes a keycap 11, a support assembly 12, an elastic body 13, a circuit layer 14, and a bracket 15. The bracket 15 is disposed on the backlight module 100 for holding the keycap 11, the support assembly 12, the elastic body 13, and the circuit layer 14 in position. The bracket 15 may have a plurality of openings (such as through holes) that allow light to pass through or to accommodate a light source. For example, the rear surface of the keycap 11 may be illuminated by the light from the backlight module 100 via openings 16 and 18, and the opening 16 may accommodate a first light source 140 of the backlight module 100 as well. The number and arrangement of the openings of the bracket 15 are not limited to the disclosure.

The circuit layer 14 is disposed between the keycap 11 and the bracket 15. The circuit layer 14 is, for example, a flexible membrane circuit in a multi-layered structure having a conductive portion 17 as a switching region to trigger signals. The elastic body 13 is disposed between the keycap 11 and the circuit layer 14, and provides a restoring force to drive the keycap 11 move up and return to its released state. The support assembly 12 is disposed between the keycap 11 and the bracket 15. The respective ends of the support assembly 12 are pivotably and movably connected to the keycap 11 and the bracket 15, such that the keycap 11 is stably moved up and down relative to the bracket 15 via the connection of the support assembly 12. The support assembly 12 is, for example but not limited to, a scissor-like mechanism that includes two supporting pieces pivotally assembled together.

The elastic body 13 is located on the circuit layer 14 corresponding to the conductive portion 17, wherein the elastic body 13 has a protrusion aligned with and disposed above the conductive portion 17. When the keycap 11 is pressed to temporarily squeeze and deform the elastic body 13, the protrusion of the elastic body 13 moves downward to press the conductive portion 17 of the circuit layer 14, such that the switch is turned on to generate an input signal. Once the applied force is removed from the keycap 11, the restoring force of the elastic body 13 drives the keycap 11 to move upward and return to the inactive (unpressed) position. In the present embodiment, the keycap 11 may have a light-transmitting portion 11a defined by, for example, at least one character represented by each button structure 10 to allow the light emitted by the backlight module 100 to pass through, and thus a light-emitting button is obtained for user identification.

The backlight module 100 under the button structure 10 includes a light-reflecting plate 110, a light guide plate 120, and a composite light-emitting layer 130 stacked from the bottom upwards to the top. The composite light-emitting layer 130 is disposed between the bracket 15 and the light guide plate 120, and the light guide plate 120 is disposed between the composite light-emitting layer 130 and the light-reflecting plate 110. As shown in FIG. 1B, the composite light-emitting layer 130 located on the light guide plate 120 has a light-shielding pattern 133 which may shade the regions that do not need to be illuminated by light, thereby avoiding light leakage. The composite light-emitting layer 130 is provided with a light-transmitting region 138 where the light-shielding pattern 133 does not cover, and the light can pass through the light-transmitting region 138 to backlight the button. In an embodiment, in order to avoid light leakage between the button structures 10, the light-shielding pattern 133 may be disposed under the gap between two adjacent keycaps 11, and the light-transmitting region 138 could be surrounded by the light-shielding patterns 133. The light-transmitting region 138 is positioned corresponding to the keycap 11, so that the light could be delivered to the button structure 10 of the light-emitting keyboard 5 (FIG. 1A).

In the present embodiment, the composite light-emitting layer 130 includes a light-transmitting substrate 131, and a light-shielding plate 134 located under the light-transmitting substrate 131. A first circuit 139, the first light source 140, and a first passivation layer 142 are arranged on the light-transmitting substrate 131. The first circuit 139 and the first light source 140 are disposed on one side of the light-transmitting substrate 131, and the first light source 140 is electrically connected to the first circuit 139. The first circuit 139 includes a printed conductive paste or a patterned metal layer, such as printed silver wiring or a patterned copper foil, but the type of the first circuit 139 is not limited thereto. After the first circuit 139 is formed on the upper surface of the light-transmitting substrate 131, the first light source 140 is disposed on the upper surface of the light-transmitting substrate 131, such that electrodes of the first light source 140 are electrically connected to the first circuit 139. The light-transmitting substrate 131 and the first circuit 139 thereon are collectively used as a circuit board that supplies power to the first light source 140. The first passivation layer 142 covers the first circuit 139, such that at least a portion of the first circuit 139 is located between the first passivation layer 142 and the light-transmitting substrate 131, thereby preventing an open circuit or a short circuit caused by the damaged circuit pattern on the light-transmitting substrate 131. In an embodiment, the first passivation layer 142 may further cover the first light source 140 to protect both of the first circuit 139 and the first light source 140. The first passivation layer 142 is, for example, a flexible polymer film having a thickness less than the thickness of the light-transmitting substrate 131.

As shown in FIG. 1B and FIG. 1C, the light-shielding plate 134 is located between the light guide plate 120 and the light-transmitting substrate 131, and the light-transmitting region 138 is defined, by the light-shielding pattern 133, on the light-shielding plate 134. The light-shielding plate 134 includes a film 135 and the light-shielding pattern 133 formed on the surface of the film 135. In the present embodiment, the film 135 is a light-transmitting substrate, and the light-shielding pattern 133 includes a light-reflecting coating 136 and a light-shielding coating 137 layered on one side of the light-transmitting substrate. If the light travelling in the light guide plate 120 is incident on the light-shielding pattern 133, the light could be reflected back into the light guide plate 120 by the light-reflecting coating 136, while the light-shielding coating 137 could prevent the light from being emitted out of the light-shielding pattern 133. In an embodiment, the light-reflecting coating 136 is a white paint, and the light-shielding coating 137 is a black paint. The structural configuration of the light-shielding pattern 133, and the colors of the light-reflecting coating 136 and the light-shielding coating 137 are not limited to the disclosure.

The first light source 140 is disposed on the surface of the light-transmitting substrate 131 distal to the light-shielding plate 134. In the present embodiment, the light-transmitting substrate 131 has its lower surface facing toward the light-shielding plate 134, and the first light source 140 is situated on the upper surface of the light-transmitting substrate 131 and functions as, for example, a top-view light source. The first light source 140 is disposed in the opening 16 of the bracket 15 corresponding to the light-transmitting portion 11a of the keycap 11, and therefore the first light source 140 does not protrude from the upper surface of the bracket 15. Thus, the light emitted by the first light source 140 under the button is adapted to upwards and directly illuminate the button structure 10a direction away from the light-shielding plate 134 so as to provide a directionally backlighting effect, thereby achieving independent light emission for a single button. In other embodiments, the stacking positions of the light-shielding plate 134 and the light-transmitting substrate 131 could be changed, such that the light-shielding plate 134 may be located between the bracket 15 and the light-transmitting substrate 131 having the light emitted from the first light source 140 not blocked by the light-shielding plate 134.

The backlight module 100 further includes a circuit board 150 and a second light source 160. The circuit board 150 is located under the light-reflecting plate 110. A portion of the light-reflecting plate 110 is disposed between the circuit board 150 and the light guide plate 120. The circuit board 150 is, for example, a flexible circuit board coupled to a power supply providing power to the second light source 160. The second light source 160 is disposed under the composite light-emitting layer 130, and is electrically coupled to the circuit board 150 through penetrating the light guide plate 120 and the light-reflecting plate 110. For example, the light-reflecting plate 110 and the light guide plate 120 are respectively provided with openings 114 and 126 in which the second light source 160 is disposed, such that the second light source 160 positioned on the circuit board 150 could go upward and be next to one side of the light guide plate 120. The second light source 160 is, for example, a side-view light source that could emit light toward the lateral side of the light guide plate 120. The light emitted by the second light source 160 is adapted to enter the light guide plate 120 and travel over the interior thereof compliant with total reflection, such that the light could be uniformly and evenly distributed throughout the entire backlight module 100 and emitted out from the light-transmitting region 138 of the light-shielding plate 134 to provide an optical effect of enhanced uniformity.

The first light source 140 and the second light source 160 may be light-emitting diodes respectively in different types or packages. In the present embodiment, the first light source 140 could be a chip-scale packaged LED without leadframe or substrate, wherein a LED chip or die is disposed on the light-transmitting substrate 131 in a flip-chip manner, and the respective electrodes of the LED die are connected to the first circuit 139 via a soldering or surface-mounting technique. Optionally, dispensing of gel with phosphor, if phosphor conversion is required, may be performed on the LED die, such that the light-transmitting encapsulation (e.g., light-curable resin with or without phosphor) covers the die for protection and/or light conversion. Compared with the leadframe-based LED with the thickness of about 0.6 mm, the miniaturized first light source 140 of the present embodiment adopts a chip-scale package without additional substrate and wire bonding, and therefore, the thickness of the first light source 140 could be thinned to 0.08 mm or less. Moreover, the circuit for the first light source 140 is made from a printed conductive paste or a patterned metal foil, which is much thinner than an ordinary circuit board (about 0.15 mm to 0.2 mm). Therefore, the backlight module 100 could be slimmed down by integrating the first light source 140 into the composite light-emitting layer 130. It should be noted that the thicknesses of the components shown in the figures only illustrate the relationship in position and thickness, which are not limited thereto.

In the present embodiment, the second light source 160 of the backlight module 100 is, for example, a side-view light source, and the backlight module 100 could evenly and uniformly illuminate the buttons of the light-emitting keyboard 5 via the second light source 160, the light-reflecting plate 110, and the light guide plate 120. In addition, the first light source 140 of the backlight module 100 is, for example, a top-view light source. For a button having a special function (e.g., hot keys) of the light-emitting keyboard 5, the backlight module 100, via the first light source 140, may provide localized backlighting which is independently adjustable for the special hot keys, thereby allowing users to quickly identify this button in a visual manner.

The configuration of the backlight module of the invention is not limited to the backlight module 100. The following embodiments would elaborate other types of backlight modules. Except for the major difference, the same or similar components as those of the previous embodiment are represented by the same or similar reference numerals and are not repeated hereinafter. In order to clearly show the detailed structure of the backlight modules, the button structure is not shown in some figures, but it should be understood that the backlight modules of the following embodiments are adapted to be disposed under the button structure to provide a button backlit effect.

Figure 2A:
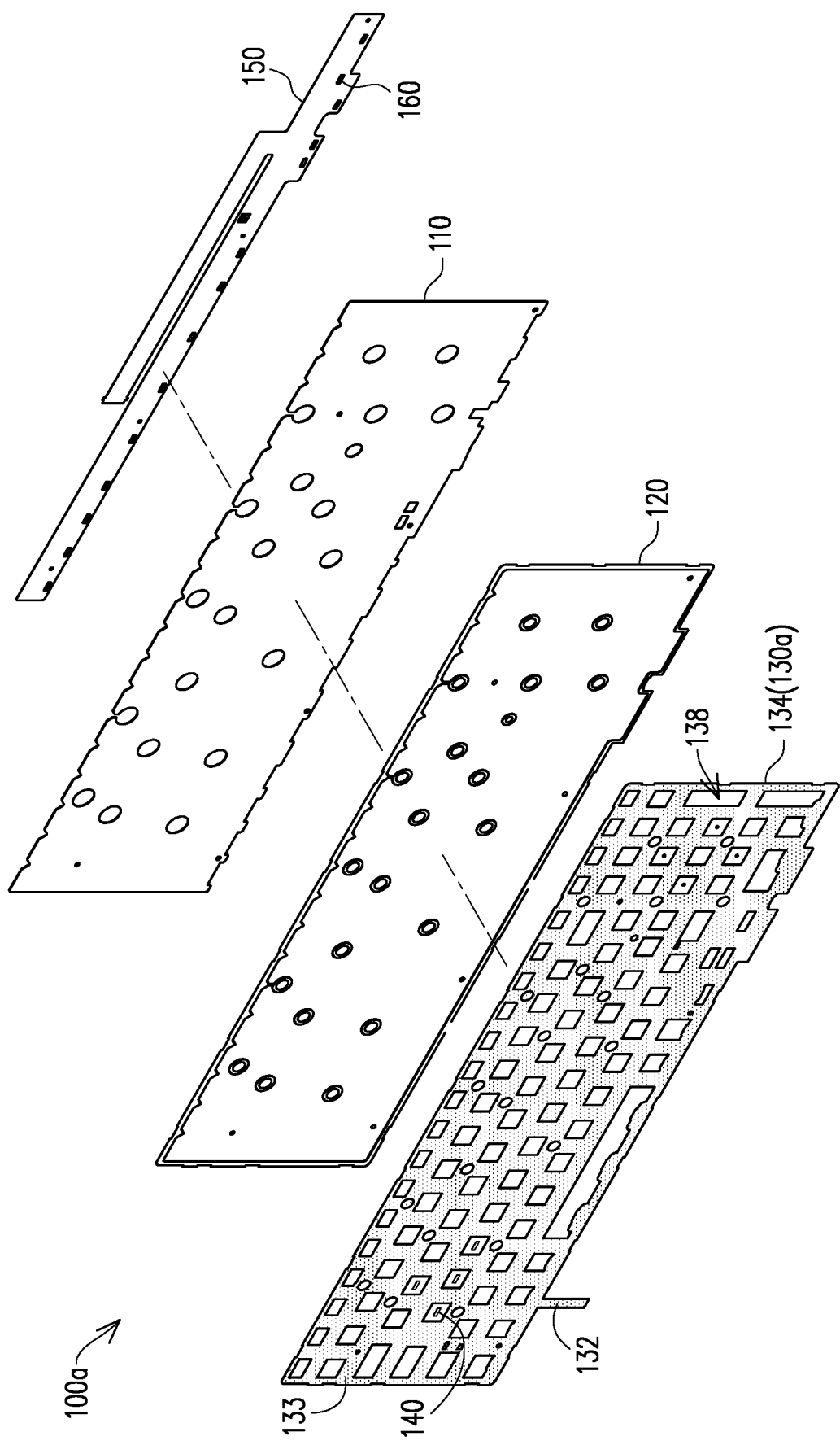
FIG. 2A is an exploded view of a backlight module according to another embodiment of the invention.
Figure 2B:
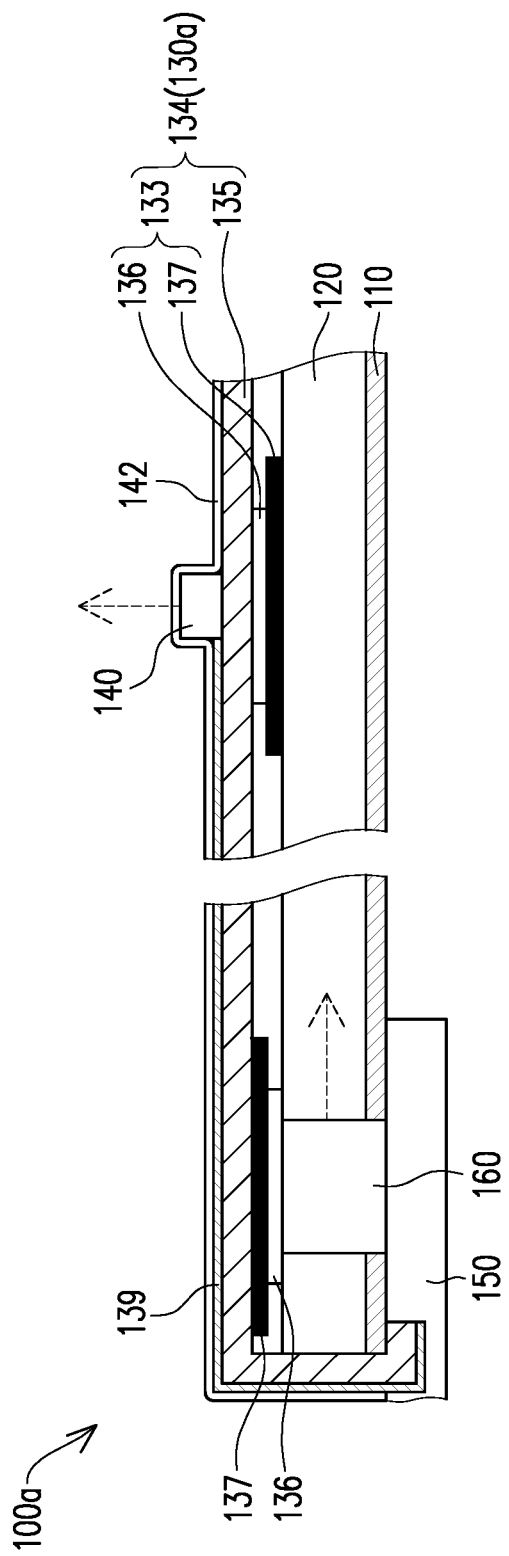
FIG. 2B is a partial cross-sectional view of the backlight module of FIG. 2A.

FIG. 2A is an exploded view of a backlight module according to another embodiment of the invention. FIG. 2B is a partial cross-sectional view of the backlight module of FIG. 2A. Referring to FIG. 2A and FIG. 2B, in the present embodiment, a composite light-emitting layer 130a of a backlight module 100a includes the light-shielding plate 134 disposed on the light guide plate 120, and the first circuit 139 disposed on the light-shielding plate 134. The first light source 140 is disposed on the light-shielding plate 134 and electrically connected to the first circuit 139. That is, the light-shielding plate 134 and the first circuit 139 thereon are collectively used as a circuit board for the first light source 140. Compared with the embodiment shown in FIG. 1B and FIG. 1C, the light-transmitting substrate 131 of the composite light-emitting layer 130 is no longer required in the composite light-emitting layer 130a of the present embodiment, such that the overall thickness of the composite light-emitting layer 130a may be reduced. The first circuit 139, the first light source 140, and the first passivation layer 142 previously on the light-transmitting substrate 131 shown in FIG. 1C are modified, in the present embodiment, to be directly disposed on the surface of the film 135 (such as the light-transmitting substrate) of the light-shielding plate 134.

In the present embodiment, the first light source 140 and the light guide plate 120 are located on two opposite sides of the light-transmitting film 135. The first light source 140 is disposed on the upper side of the light-shielding plate 134, while the light guide plate 120 is disposed on the lower side of the light-shielding plate 134; that is, the first light source 140 is disposed on the surface of the light-shielding plate 134 distal to the light guide plate 120. When the button structure is combined with the backlight module 100a, the opening 16 of the bracket 15 shown in FIG. 1C may be used as the accommodating space for the first light source 140, and the light emitted by the first light source 140 illuminates toward a direction opposite to the light guide plate 120 to provide the individual button with the independent and directional backlighting. The light emitted by the second light source 160 is adapted to enter the light guide plate 120 to provide an optical effect with uniform brightness, as depicted in the above embodiment.

In addition, in the composite light-emitting layer 130a, the first circuit 139 disposed on the light-shielding plate 134 could be electrically connected to the circuit board 150. The first circuit 139 laid out at an end 132 of the composite light-emitting layer 130a is, for example, coupled to the circuit of the circuit board 150 via a soldering or hotbar bonding. That is to say, even if the first light source 140 and the second light source 160 are located on different layers, the interconnection therebetween could be conducted via the circuit board 150, such that the single supply power could provide power to the first light source 140 and the second light source 160. Accordingly, the circuit design can be simplified, and the respective light emission of the first light source 140 and the second light source 160 could be independently controlled as well. In other embodiments, the first light source 140 and the second light source 160 may be connected to different power supplies; that is, the first circuit 139 of the first light source 140 may not be connected to the circuit board 150.

Figure 2C:
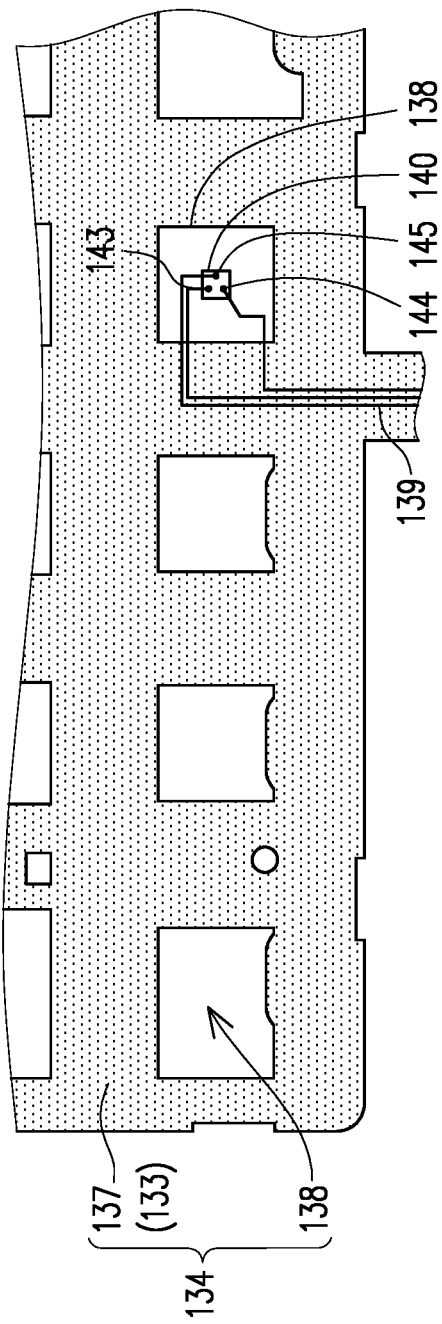
FIG. 2C is a partial view of the composite light-emitting layer of the backlight module of FIG. 2A.
Figure 2D:
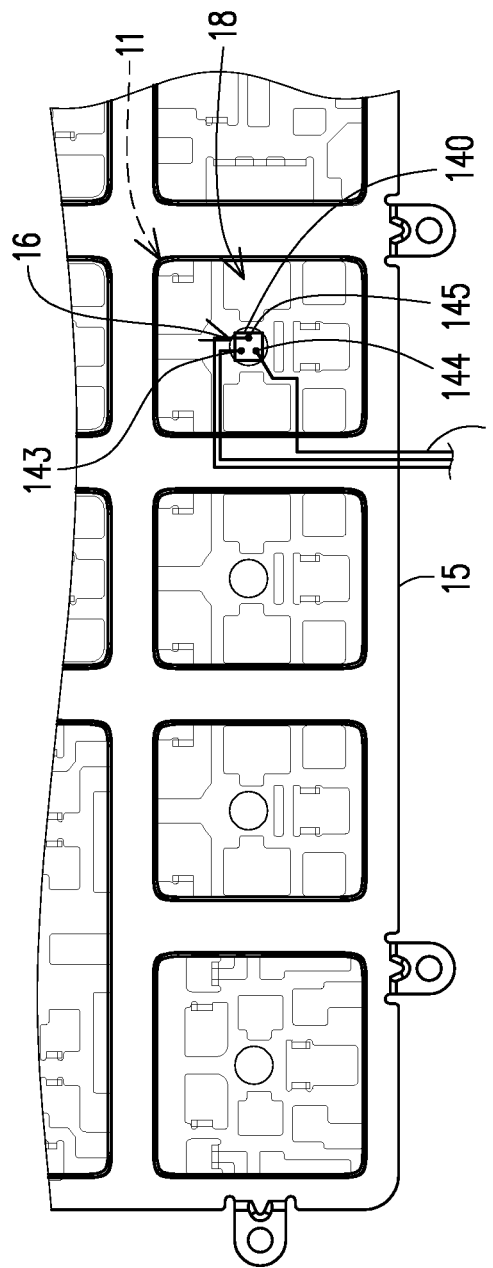
FIG. 2D is a diagram showing the positional relationship between a first light source, a first circuit, and a bracket of a button structure of the backlight module of FIG. 2A.

FIG. 2C is a partial view of the composite light-emitting layer of the backlight module of FIG. 2A. FIG. 2D is a diagram showing the positional relationship between a first light source, a first circuit, and a bracket of a button structure of the backlight module of FIG. 2A. Referring to FIG. 2C, the first light source 140 corresponding to the single button structure is located at a position corresponding to the light-transmitting region 138, and the first circuit 139 coupled to the first light source 140 is distributed along the light-shielding pattern 133 on the light-shielding plate 134. Referring to FIG. 2D, in the present embodiment, the first light source 140 is located within the range corresponding to the opening 16 of the bracket 15 and corresponding to the light-transmitting portion 11a of the keycap 11. The majority of the first circuit 139 is located at a position outside the projection of the keycap 11, while a portion of the first circuit 139 under the keycap 11 is arranged at a position corresponding to the bracket 15 where the openings 16 and 18 are not formed (i.e., the non-opening region of the bracket 15). Thus, the layout of the first circuit 139 may be hidden under the bracket 15. Since the first circuit 139 of the composite light-emitting layer 130a is arranged corresponding to the main body of the bracket 15 to avoid the openings 16 and 18, the first circuit 139, for the user, could be invisible through the light-transmitting region 138 and barely impact the optical effects.

As shown in FIG. 2C and FIG. 2D, the first light source 140 may include a plurality of light-emitting diodes 143, 144, and 145. In an embodiment, the light-emitting diodes 143, 144, and 145 emit light of different wavelengths, such as red, green, and blue, but are not limited thereto. The light-emitting diodes 143, 144, and 145 are respectively connected to three separate circuit layouts (collectively referred to as the first circuit 139), such that the light-emitting states of the light-emitting diodes 143, 144, and 145 may be individually and independently controlled, thus achieving combinations of single-color light emission or mixed light emission. That is, a plurality of light-emitting diodes having different colors (collectively referred to as the first light source 140) are disposed under a single button, and the keycap 11 could exhibit various backlighting effects.

Figure 3:
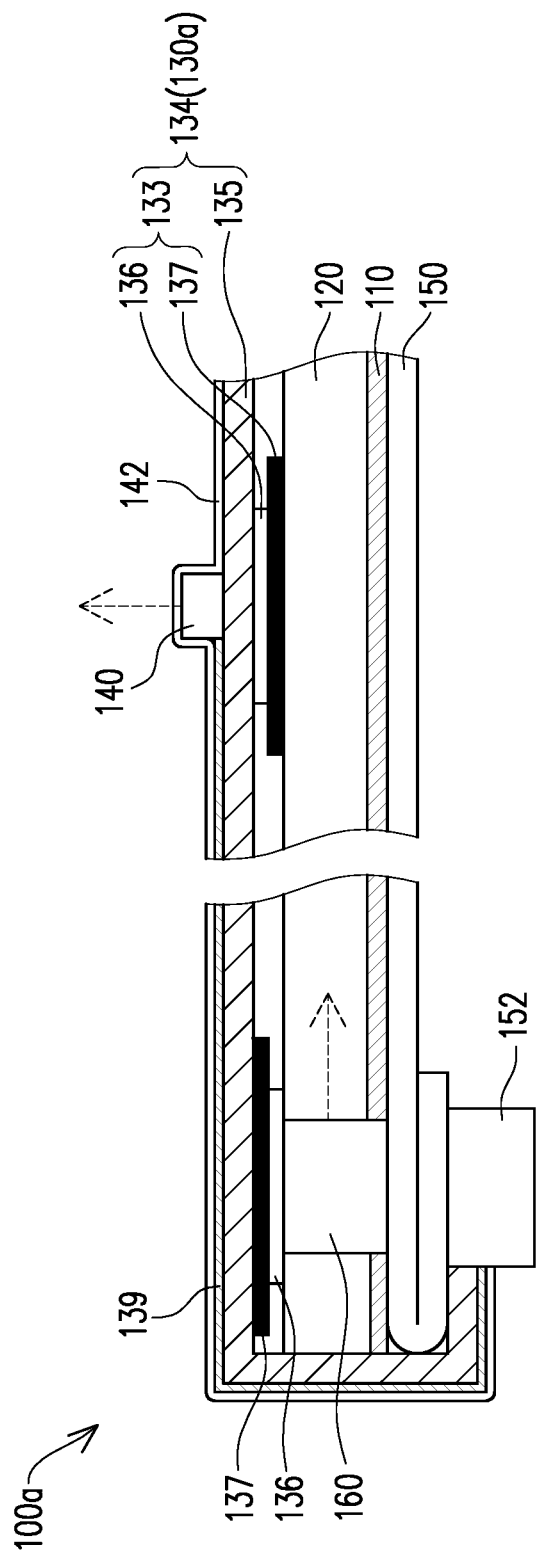
FIG. 3 is a partial cross-sectional view of a backlight module according to another embodiment of the invention.

FIG. 3 is a partial cross-sectional view of a backlight module according to another embodiment of the invention. Referring to FIG. 3, the major difference between a backlight module 100b of FIG. 3 and the backlight module 100a of FIG. 2B is that, in the present embodiment, the first circuit 139 is connected to the circuit board 150 via a connector 152. The film 135 and the first circuit 139 thereon may be easily inserted into the connector 152 coupled to the circuit layout of the circuit board 150 at the end 132 of the composite light-emitting layer 130a to be electrically connected to the circuit board 150. It should be noted that the circuit board 150, as depicted in FIG. 3, is a single-layer circuit board, and the connector 152 is disposed under the circuit board 150 in a folding manner to connect the end 132 of the first circuit 139. In other embodiments, the circuit board 150 may be a double-layer circuit board, and the connector 152 may be directly mounted on the lower surface of the circuit board 150 without folding the circuit board 150.

Figure 4A:
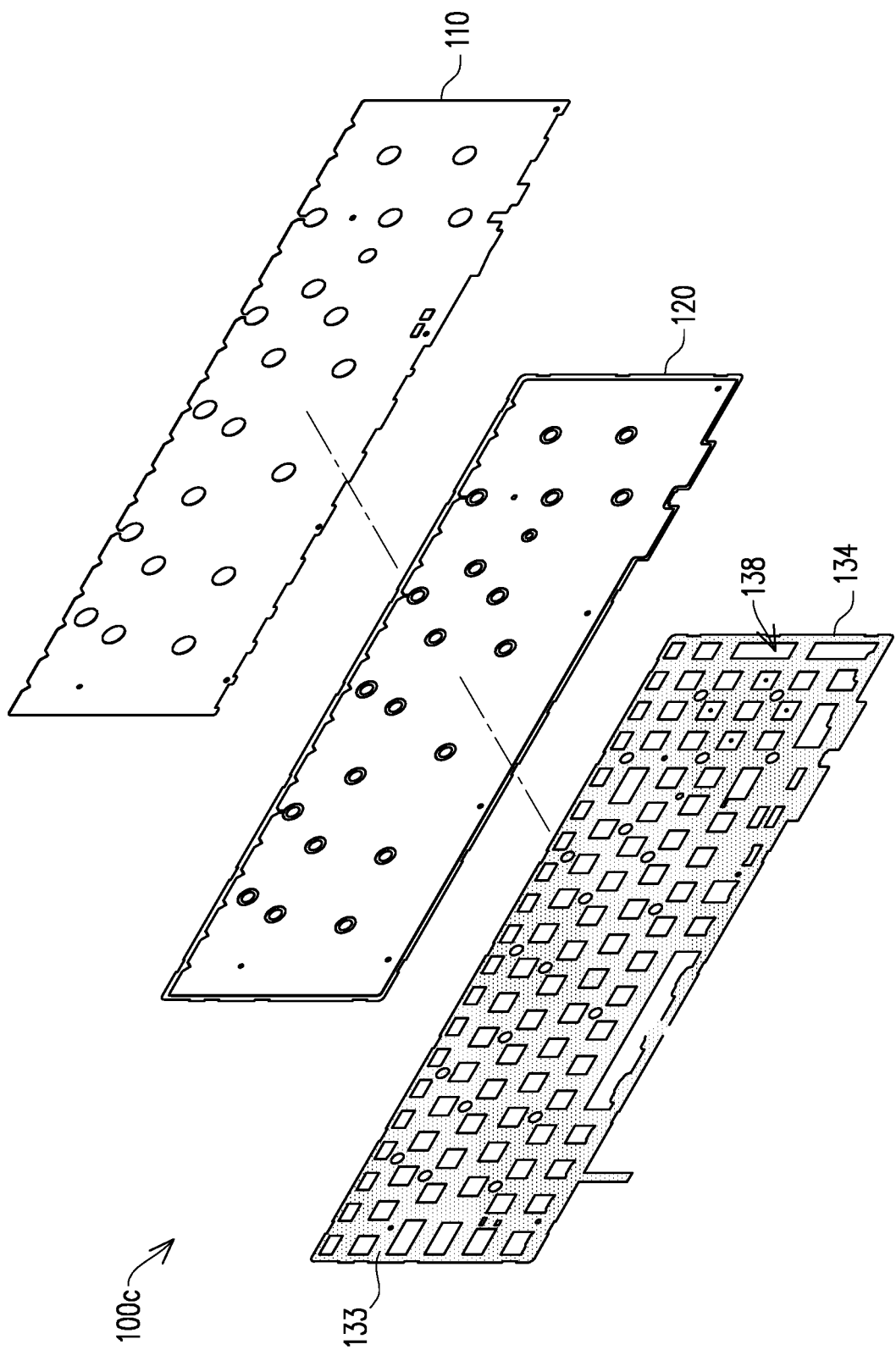
FIG. 4A is an exploded view of a backlight module according to another embodiment of the invention.

FIG. 4A is an exploded view of a backlight module according to another embodiment of the invention. FIG. 4B is a partial cross-sectional view of the backlight module of FIG. 4A. Referring to FIG. 4A and FIG. 4B, in the present embodiment, the first light source 140 and the light guide plate 120 of a backlight module 100c are located on the same side of the light-transmitting substrate (i.e., the film 135). The light guide plate 120 has a hole 122, and the first light source 140 is disposed on the surface of the light-shielding plate 134 facing the light-reflecting plate 110 and corresponding to the hole 122. The first light source 140 could be arranged in the hole 122 or disposed on the periphery of the hole 122. The light emitted by the first light source 140 is adapted to enter the light guide plate 120, be reflected by the light-reflecting plate 110, and then be emitted through the light-transmitting region 138. In addition, the first light source 140 on the light-shielding plate 134 is disposed at a position corresponding to the light-shielding pattern 133, such that the light of the first light source 140 could be reflected back into the light guide plate 120 by the light-reflecting coating 136 and be uniformly distributed over the entire light guide plate 120, and leakage from the light-shielding coating 137 may be prevented as well.

In the present embodiment, light emission toward the light guide plate 120 by the side-view light source may be achieved by the first circuit 139 and the first light source 140 disposed on the light-shielding plate 134, so as to obtain the light path similar to the second light source 160 shown in FIG. 2A and FIG. 2B. Therefore, the flexible circuit board 150 and the second light source 160 of FIG. 2A and FIG. 2B are not required for the backlight module 100c of the present embodiment, thereby reducing the thickness thereof. That is to say, the first light source 140 of the present embodiment does not function as independent backlighting for a single button, but replaces the side-view light source to make the light emitted by the first light source 140 enter the light guide plate 120, such that a backlighting effect with uniform and even brightness could be obtained via the first light source 140.

FIG. 4C is a partial cross-sectional view of a backlight module according to another embodiment of the invention. Referring to FIG. 4C, in the present embodiment, a composite light-emitting layer 130c1 of a backlight module 100c1 is disposed under the light guide plate 120 and may be used as a light-reflecting plate of the backlight module 100c1. Since the bracket of the button structure is disposed above the backlight module 100c1, the light guide plate 120 is disposed between the bracket and the composite light-emitting layer 130c1. The light-shielding plate 134 may be further disposed above the light guide plate 120. The light emitted by the composite light-emitting layer 130c1 under the light guide plate 120 is adapted to enter the interior of the light guide plate 120 and to be distributed over the light guide plate 120, until the light is emitted out from the top surface of the light guide plate 120 not covered by the light-shielding coating 137 and emitted toward the button structure.

The composite light-emitting layer 130c1 includes a light-transmitting substrate 111, and a first circuit 112, a first light source 170, and a first passivation layer 172 disposed on the light-transmitting substrate 111. The first light source 170 is electrically connected to the first circuit 112. The first circuit 112, the first light source 170, and the light guide plate 120 are located on the same side (such as the upper surface) of the light-transmitting substrate 111. The light guide plate 120 has a hole 123, and the first light source 170 on the light-transmitting substrate 111 is disposed at a position corresponding to the hole 123. In an embodiment, the first light source 170 is arranged in the hole 123 or is located on the periphery of the hole 123. The first passivation layer 172 covers the first circuit 112 to prevent the damaged circuit pattern for the first light source 170. The first passivation layer 172 may be a light-reflecting coating (such as white paint) or a light-reflecting polymer film, which could reflect light back into the light guide plate 120 and prevent the first circuit 112 layout from affecting the optical effects of the backlight module 100c1.

The first light source 170 is, for example, exposed outside the first passivation layer 172 to prevent the first passivation layer 172 from shading the light emitted from the first light source 170 and interfering the light coupling of the light guide plate 120. In addition, the lower surface of the light-transmitting substrate 111 is provided with a light-shielding coating 117 as a light-shielding pattern of the composite light-emitting layer 130c1. The light-shielding coating 117 and the first light source 170 are located on opposite sides of the light-transmitting substrate 111. The light-shielding coating 117 is, for example, fully coated on the lower surface of the light-transmitting substrate 111 to prevent the light leakage from the bottom of the composite light-emitting layer 130c1. That is, the reflective first passivation layer 172 is arranged at the top of the composite light-emitting layer 130c1, and the light-shielding coating 117 (i.e., a light-shielding pattern) is arranged at the bottom thereof. Thus, the composite light-emitting layer 130c1 may be used as a light-reflecting plate of the backlight module 100c1 while providing a light-emitting function.

Figure 5:
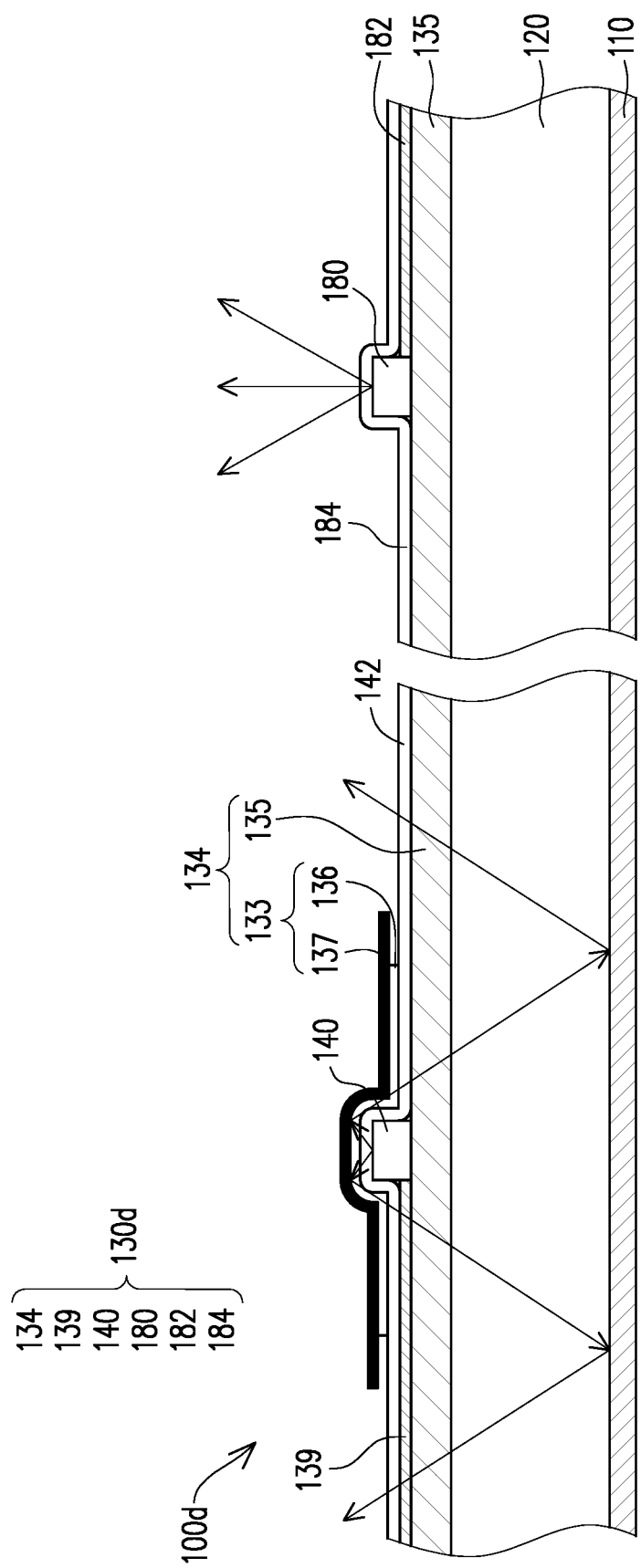
FIG. 5 to FIG. 7 are partial cross-sectional views of various backlight modules according to other embodiments of the invention.
Figure 6:
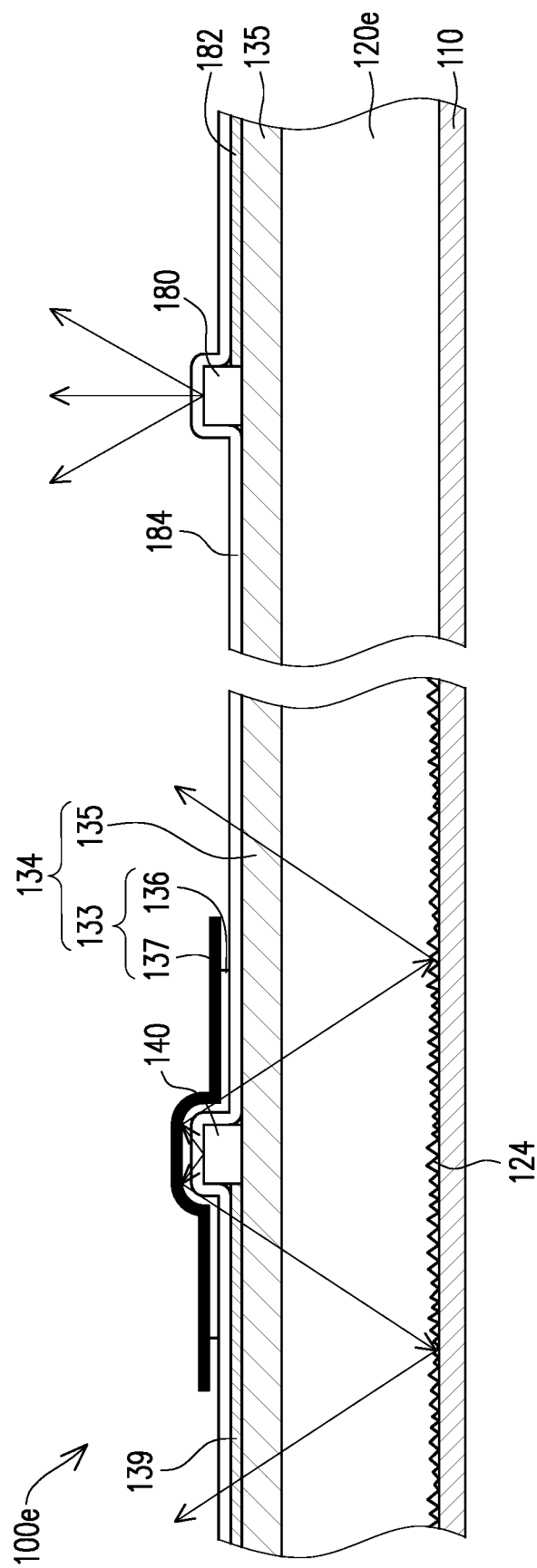
Figure 7:
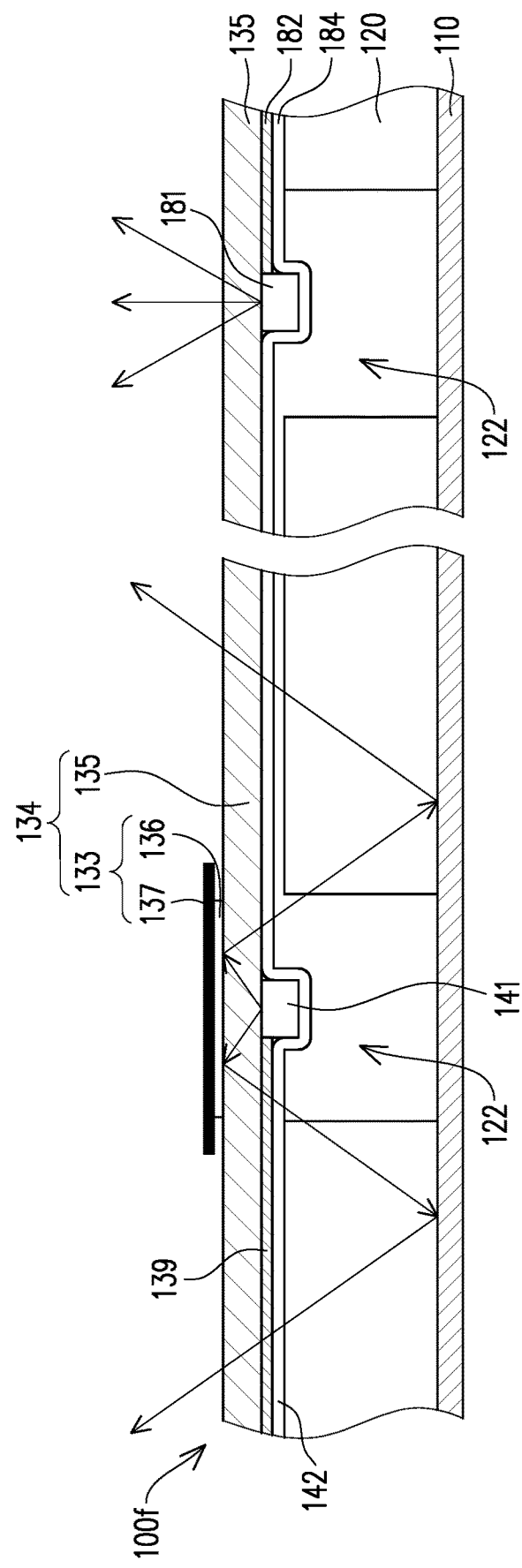

The above embodiments are described with the composite light-emitting layer separately providing the function of top-view light source or side-view light source; however, in other embodiments of the invention, both kinds of the light sources may be integrated into a single composite light-emitting layer. FIG. 5 to FIG. 7 are partial cross-sectional views of various backlight modules according to other embodiments of the invention. Similarly, the button structure is not shown in the following drawings, but it should be understood that the backlight modules below are disposed under the button structure to provide a backlit button. The same or similar components as the previous embodiments are represented by the same reference numerals in the following embodiments.

Referring first to FIG. 5, in a backlight module 100d of the present embodiment, a composite light-emitting layer 130d includes the film 135, and the first circuit 139, the first light source 140, and the first passivation layer 142 disposed on the film 135. The composite light-emitting layer 130d further includes a second light source 180, a second circuit 182, and a second passivation layer 184. In the present embodiment, the film 135 is a light-transmitting substrate, and the first circuit 139, the first light source 140, the second circuit 182, and the second light source 180 are disposed on the same side surface of the light-transmitting substrate (the film 135), and the light source 140 and the second light source 180 are electrically connected to the first circuit 139 and the second circuit 182, respectively. Similar to the first passivation layer 142 covering the first circuit 139, the second passivation layer 184 covers the second circuit 182, such that at least a portion of the second circuit 185 is located between the second passivation layer 184 and the light-transmitting substrate (the film 135) to avoid damage to the circuit layout. The first light source 140 and the second light source 180 are located on the same side of the light-transmitting substrate (the film 135). The first circuit 139 and the second circuit 182 may be formed simultaneously on the film 135, and the first passivation layer 142 and the second passivation layer 184 could be disposed on the first circuit 139 and the second circuit 182 in a single step. Therefore, the first circuit 139 and the second circuit 182 may be made of the same material, and the first passivation layer 142 and the second passivation layer 184 may be the same film covering the different regions.

The first light source 140 and the second light source 180 are disposed on the surface of the film 135 that is distal to the light guide plate 120 (i.e., the upper surface of the film 135). The light-reflecting coating 136 and the light-shielding coating 137 that are collectively used as the light-shielding pattern are disposed above the first light source 140, for example. The light emitted by the first light source 140 is emitted upward and then reflected by the light-reflecting coating 136 so as to enter the light guide plate 120 and be reflected again by the reflective plate 110, until the light is emitted out from a portion of the light guide plate 120 not shaded by the light-shielding coating 137, thereby obtaining the uniform light emission over the backlight module 100d. Since the upper portion of the second light source 180 is not shaded, the emitted light could directly travel toward a direction opposite to the light guide plate 120, thereby upward illuminating a single button. The first light source 140 is adapted to emit light toward the light guide plate 120 to provide an overall backlighting with uniformity for replacing the side-view light source; the second light source 180 is used as a top-view light source for providing independent and localized backlighting for special buttons (e.g., hot keys). The second light source 180 may include a plurality of light-emitting diodes (not shown) that emit light having different wavelengths to achieve a combination of light emission with various colors. In addition, the film 135 may further have a light-shielding pattern under the second light source 180 to further prevent the light of the second light source 180 from entering the light guide plate 120 and affecting the colored light mixing. In this way, the backlight module 100d disposed under the button structure could deliver the even and uniform backlighting to the entire keyboard and provide a specific button with the directional backlighting via the composite light-emitting layer 130d, thereby exhibiting various backlighting effects.

Referring to FIG. 6, the major difference between a backlight module 100e of FIG. 6 and the backlight module 100d of FIG. 5 is that, in the present embodiment, a light guide plate 120e further has a plurality of microstructures 124. In detail, the microstructures 124 are separated from each other, and could be arranged on the surface of the light guide plate 120e away from the first light source 140 and corresponding to the first light source 140, such that the optical path could be for changed to uniformly distribute the light and to directionally correct the optical effect. In an embodiment, the microstructures 124 of the light guide plate 120e are concave-convex microstructures having a contour, for example, of a concave prism, an annular V groove, a dot, a column, a cone, a pyramid, or a combination of the above, thereby enabling the increased light refraction or scattering to take place on the lower surface of the light guide plate 120e to change the transmission direction of the light and distribute the light uniformly. The microstructures 124 could be disposed on the lower surface of the light guide plate 120e only at a position corresponding to the first light source 140, or could be disposed on the entire lower surface of the light guide plate 120e. In addition, the microstructures 124 of the light guide plate 120e may be disposed at a position corresponding to the light-transmitting character portion of the keycap, such the microstructures 124 are, for example, distributed under the opening of the bracket of the button structure to adjust the exit angle of the light, thereby illuminating the rear side of keycap through the opening of the bracket.

Referring to FIG. 7, the major difference between a backlight module 100f of FIG. 7 and the backlight module 100d of FIG. 5 is that, in the present embodiment, the first light source 141 and the second light source 181 of the backlight module 100f are disposed on the surface of the light-shielding plate 134 facing toward the light-reflecting plate 110. That is, the first light source 141, the second light source 181, and the light guide plate 120 are located on the same side of the light-shielding plate 134. The first light source 141 and the second light source 181 are disposed on the lower surface of the film 135. The light guide plate 120 has the holes 122, and the first light source 141 and the second light source 181 are disposed at the positions corresponding to the holes 122. For example, the first light source 141 and the second light source 181 are configured into the holes 122, or located on the periphery of the holes 122, so that the upper surface of the film 135 of the light-shielding plate 134 could be flat without protrusions caused by the light sources. The light-reflecting coating 136 and the light-shielding coating 137 are disposed above the first light source 141. Similarly, the light emitted by the first light source 141 is emitted upward and then reflected by the light-reflecting coating 136 to enter the light guide plate 120, and then is reflected by the reflective plate 110 again, until the light is extracted out of the the light guide plate 120, thereby providing the uniform illumination. The second light source 181 that is not shaded emits the light directly and toward a direction opposite to the light-reflecting plate 110, so as to achieve the directional and independent backlighting effect for a specific button.

Based on the above, the light-emitting keyboard and the backlight module of the invention have a composite light-emitting layer disposed under the bracket of the button structure, and the first light source and the first circuit are integrated into the composite light-emitting layer having the light-shielding pattern, so that the backlight module has a scaled-down thickness. The optical path of the first light source may optionally emit light toward a direction away from the light guide plate, so as to directly illuminate the button structure to provide a localized backlighting effect to the individual buttons. The optical path of the first light source may optionally enter the light guide plate and then be distributed over the entire light guide plate, thereby providing an overall backlighting with enhanced uniformity.

Lastly, it should be mentioned that: each of the above embodiments is only used to describe the technical solutions of the invention and is not intended to limit the invention; and although the invention is described in detail via each of the above embodiments, those having ordinary skill in the art should understand that: modifications may still be made to the technical solutions recited in each of the above embodiments, or portions or all of the technical features thereof may be replaced to achieve the same or similar results; the modifications or replacements do not make the nature of corresponding technical solutions depart from the scope of the technical solutions of each of the embodiments of the invention.

What is claimed is:

1. A light-emitting keyboard, comprising:
a bracket having at least one opening;
a keycap disposed on the bracket and connected to the bracket via a support assembly;
a circuit layer disposed between the keycap and the bracket;
a light guide plate disposed under the bracket; and
a composite light-emitting layer disposed under the bracket and having a light-shielding pattern, the composite light-emitting layer comprising:
a light-transmitting substrate;
a first circuit disposed on one side of the light-transmitting substrate;
a first light source disposed on one side of the light-transmitting substrate and electrically connected to the first circuit; and
a first passivation layer covering the first circuit, wherein at least a portion of the first circuit is located between the first passivation layer and the light-transmitting substrate.

2. The light-emitting keyboard of claim 1, further comprising a light-reflecting plate disposed under the bracket, wherein the light guide plate is disposed between the composite light-emitting layer and the light-reflecting plate.

3. The light-emitting keyboard of claim 2, wherein the light-shielding pattern has a light-transmitting region corresponding to the keycap, and the first light source is located in the light-transmitting region.

4. The light-emitting keyboard of claim 2, wherein the composite light-emitting layer further comprises a light-shielding plate disposed between the light-transmitting substrate and the light guide plate or disposed between the bracket and the light-transmitting substrate, and the light-shielding pattern is formed on the light-shielding plate.

5. The light-emitting keyboard of claim 2, further comprising a second light source and a circuit board disposed under the composite light-emitting layer, wherein the second light source is disposed towards the light guide plate and is electrically connected the circuit board under the light guide plate, and the first circuit of the composite light-emitting layer is electrically connected to the circuit board.

6. The light-emitting keyboard of claim 2, wherein the composite light-emitting layer further comprises:
a second circuit disposed on one side of the light-transmitting substrate;
a second light source disposed on one side of the light-transmitting substrate and electrically connected to the second circuit; and
a second passivation layer covering the second circuit, wherein at least a portion of the second circuit is located between the second passivation layer and the light-transmitting substrate,
wherein the light-shielding pattern is disposed corresponding to the first light source.

7. The light-emitting keyboard of claim 6, wherein the first light source and the second light source are located on a same side of the light-transmitting substrate, and the first light source emits a light towards the light guide plate.

8. The light-emitting keyboard of claim 2, wherein the first light source and the light guide plate are located on opposite sides of the light-transmitting substrate, and the first light source is disposed in the opening of the bracket.

9. The light-emitting keyboard of claim 1, wherein the first light source and the light guide plate are located on a same side of the light-transmitting substrate, the light guide plate has a hole, and the first light source is disposed at a position corresponding to the hole.

10. The light-emitting keyboard of claim 1, wherein the keycap has at least one light-transmitting portion, and the first light source is disposed corresponding to the light-transmitting portion.

11. The light-emitting keyboard of claim 1, wherein the light guide plate is disposed between the bracket and the composite light-emitting layer, and the first light source and the light guide plate are located on a same side of the light-transmitting substrate.

12. The light-emitting keyboard of claim 11, wherein the first light source and the light-shielding pattern are located on opposite sides of the light-transmitting substrate, the light-shielding pattern covers a lower surface of the light-transmitting substrate, and the first passivation layer is a reflective layer.

13. The light-emitting keyboard of claim 1, wherein the first circuit of the composite light-emitting layer comprises a printed conductive paste or a patterned metal layer, and the first circuit is located under a non-opening region of the bracket.

14. The light-emitting keyboard of claim 1, wherein the first light source comprises a plurality of light-emitting diodes, and each of the light-emitting diodes emits light with a different wavelength.

15. The light-emitting keyboard of claim 1, wherein the light guide plate has a plurality of microstructures, disposed on a lower or upper surface of the light guide plate corresponding to the opening of the bracket.

16. A backlight module adapted to be disposed under a button structure, wherein the backlight module comprises:
a light-reflecting plate;
a light guide plate disposed on the light-reflecting plate;
a composite light-emitting layer disposed on the light guide plate, and the composite light-emitting layer comprising a first light source,
wherein the light guide plate has a plurality of microstructures disposed on a surface of the light guide plate opposite to the first light source,
wherein the light guide plate has a hole, and the first light source is disposed at a position corresponding to the hole.

17. The backlight module of claim 16, wherein the composite light-emitting layer comprises a light-transmitting substrate, a first circuit disposed on the light-transmitting substrate, and a light-shielding plate, the first light source is disposed on the light-transmitting substrate and electrically connected to the first circuit, the light-shielding plate is located between the light guide plate and the light-transmitting substrate or located between the button structure and the light-transmitting substrate, and a light-shielding pattern is formed on the light-shielding plate.

18. The backlight module of claim 17, further comprising:
a circuit board disposed under the light-reflecting plate; and
a second light source disposed on and electrically connected to the circuit board, and the second light source passing through the light-reflecting plate and being disposed towards the light guide plate,
wherein the first circuit is electrically connected to the circuit board.

19. The backlight module of claim 16, wherein the composite light-emitting layer comprises a light-shielding plate disposed on the light guide plate, and a first circuit disposed on the light-shielding plate, and the first light source is disposed on the light-shielding plate and electrically connected to the first circuit.

20. The backlight module of claim 19, wherein the first light source is disposed on a surface of the light-shielding plate facing the light guide plate and the first light source on the light-shielding plate is arranged within a coverage of a light-shielding pattern of the composite light-emitting layer.

21. The backlight module of claim 19, wherein the composite light-emitting layer has a light-transmitting region not covered by a light-shielding pattern of the composite light-emitting layer, and the first light source is disposed on a surface of the light-shielding plate facing the light guide plate or the light-reflecting plate, and is arranged within a coverage of the light-transmitting region.

22. The backlight module of claim 19, wherein the first light source is disposed on a surface of the light-shielding plate distal to the light guide plate.

23. The backlight module of claim 16, wherein the first circuit is located at a position corresponding to a light-shielding pattern of the composite light-emitting layer.

24. The backlight module of claim 16, wherein the composite light-emitting layer comprises a light-transmitting substrate, and a first circuit disposed on the light-transmitting substrate, the first light source is disposed on the light-transmitting substrate and electrically connected to the first circuit, the first light source and the light guide plate are located on a same side of the light-transmitting substrate, and the first light source and a light-shielding pattern of the composite light-emitting layer are located on two opposite surfaces of the light-transmitting substrate.

* * * * *